(12) United States Patent
Romagnoli et al.

(10) Patent No.: US 11,789,593 B2
(45) Date of Patent: Oct. 17, 2023

(54) DISPLAYING QUEUE INFORMATION IN A GRAPHICAL USER INTERFACE OF AN ISSUE TRACKING SYSTEM

(71) Applicants: Atlassian Pty Ltd., Sydney (AU); Atlassian US, Inc., San Francisco, CA (US)

(72) Inventors: Jose Ignacio Romagnoli, Sydney (AU); Christopher Charles Mann, Sydney (AU)

(73) Assignees: ATLASSIAN PTY LTD., Sydney (AU); ATLASSIAN US, INC., San Francisco, CA (US)

( * ) Notice: Subject to any disclaimer, the term of this patent is extended or adjusted under 35 U.S.C. 154(b) by 0 days.

(21) Appl. No.: 18/096,991

(22) Filed: Jan. 13, 2023

(65) Prior Publication Data
US 2023/0205396 A1 Jun. 29, 2023

Related U.S. Application Data

(63) Continuation of application No. 17/565,368, filed on Dec. 29, 2021, now Pat. No. 11,556,225.

(51) Int. Cl.
*G06F 3/0482* (2013.01)
*G06F 16/242* (2019.01)
(Continued)

(52) U.S. Cl.
CPC ........ *G06F 3/0482* (2013.01); *G06F 16/2423* (2019.01); *G06F 16/287* (2019.01); *G06Q 10/063114* (2013.01)

(58) Field of Classification Search
CPC ..................................................... G06F 3/0482
(Continued)

(56) References Cited

U.S. PATENT DOCUMENTS 6,222,535 B1 * 4/2001 Hurd, II ................. G06Q 10/10
715/971
9,740,457 B1 * 8/2017 Liu ........................... G06F 8/71
(Continued)

OTHER PUBLICATIONS

Atlassian, "Documentation for JIRA service desk 3.1", online available at [https://product-downloads.atlassian.com/software/jira/downloads/documentation/SERVICEDESKSERVER031.pdf], published on 2016, 222 pages. (Year: 2016).*

*Primary Examiner* — Reza Nabi
(74) *Attorney, Agent, or Firm* — Brownstein Hyatt Farber Schreck, LLP

(57) ABSTRACT

Methods for displaying improved user interfaces are disclosed. The method includes receiving a user interface request to display a user interface of an issue tracking system from a user device. The user interface displays a plurality of objects and the user interface request includes a user identifier of a user of the user device and a user identifier of the requested user interface. The method further includes determining a time since the user last viewed the user interface, retrieving object data for the requested user interface based on the user interface identifier, retrieving activity data for the requested user interface based on the time since the user last viewed the user interface, and communicating the object data and activity data to the user device for displaying on the user device, the user device displaying the object data and displaying one or more activity indicators based on the received activity data.

20 Claims, 10 Drawing Sheets

(51) Int. Cl.
*G06Q 10/0631* (2023.01)
*G06F 16/28* (2019.01)

(58) Field of Classification Search
USPC .......................................................... 715/206
See application file for complete search history.

(56) References Cited

U.S. PATENT DOCUMENTS

| | | | |
|---|---|---|---|
| 11,132,285 B1* | 9/2021 | Sukhyani | G06F 11/3692 |
| 11,416,124 B2* | 8/2022 | Bass | G06F 3/0484 |
| 2002/0049962 A1* | 4/2002 | Kelbaugh | G06F 11/3664 |
| | | | 714/E11.208 |
| 2003/0126003 A1* | 7/2003 | vom Scheidt | G06Q 10/10 |
| | | | 705/51 |
| 2004/0148610 A1* | 7/2004 | Tsun | G06F 9/4843 |
| | | | 718/102 |
| 2004/0243677 A1* | 12/2004 | Curbow | G06Q 10/109 |
| | | | 709/206 |
| 2005/0050210 A1* | 3/2005 | Kennedy | H04L 9/40 |
| | | | 709/229 |
| 2006/0047698 A1* | 3/2006 | Fox | G06F 21/6218 |
| 2006/0085238 A1* | 4/2006 | Oden | G06Q 10/063118 |
| | | | 705/7.17 |
| 2006/0218028 A1* | 9/2006 | Kelly | G06Q 10/0639 |
| | | | 705/7.11 |
| 2008/0272907 A1* | 11/2008 | Bonansea | H04M 1/724 |
| | | | 340/539.11 |
| 2008/0301296 A1* | 12/2008 | York | G06Q 10/06 |
| | | | 709/225 |
| 2012/0143976 A1* | 6/2012 | Lindquist | H04L 65/1043 |
| | | | 709/206 |
| 2013/0218780 A1* | 8/2013 | Buzz | G06Q 10/06 |
| | | | 705/301 |
| 2013/0283197 A1* | 10/2013 | Skidmore | A61M 16/024 |
| | | | 715/771 |
| 2014/0236649 A1* | 8/2014 | Hamid | G06Q 10/063 |
| | | | 705/7.11 |
| 2016/0182311 A1* | 6/2016 | Borna | H04L 51/224 |
| | | | 705/7.19 |
| 2016/0350689 A1* | 12/2016 | Baek | G06Q 10/06313 |
| 2019/0303139 A1* | 10/2019 | Pechacek | G06F 8/36 |
| 2019/0385113 A1* | 12/2019 | Dumitras | G07C 1/10 |
| 2020/0034033 A1* | 1/2020 | Chaudhri | H04L 51/063 |
| 2020/0042623 A1* | 2/2020 | Barnes | G06Q 10/103 |
| 2021/0028975 A1* | 1/2021 | Mortensen | G06N 3/088 |
| 2021/0232573 A1* | 7/2021 | Yakovlev | G06F 16/2455 |
| 2021/0405830 A1* | 12/2021 | Erickson | G06F 8/24 |
| 2021/0406787 A1* | 12/2021 | Zittel | G06Q 10/06316 |
| 2022/0004296 A1* | 1/2022 | Bass | G06Q 10/101 |
| 2022/0036014 A1* | 2/2022 | Bar-on | G06F 40/216 |
| 2022/0070051 A1* | 3/2022 | Mortensen | G06N 3/088 |
| 2022/0083982 A1* | 3/2022 | Palandro | G06Q 10/103 |
| 2022/0156138 A1* | 5/2022 | Hunter | G06F 3/0482 |
| 2022/0207489 A1* | 6/2022 | Gupta | G06Q 10/063114 |

\* cited by examiner

DISPLAYING QUEUE INFORMATION IN A GRAPHICAL USER INTERFACE OF AN ISSUE TRACKING SYSTEM

CROSS-REFERENCE TO RELATED APPLICATION(S)

This application is a continuation patent application of U.S. patent application Ser. No. 17/565,368, filed Dec. 29, 2021 and titled "Displaying Queue Information in a Graphical User Interface of an Issue Tracking System," the disclosure of which is hereby incorporated herein by reference in its entirety.

TECHNICAL FIELD

Aspects of the present disclosure are directed to graphical user interfaces, and in particular, to improved graphical user interfaces.

BACKGROUND

Oftentimes, users view summary user interfaces that display a plurality of items and data associated with these items. For example, user may view a dashboard that shows all the intellectual property assets owned by a company at different stages in their lives. In other examples, a user working in a service helpdesk may wish to view a list of pending issues/tickets that the user and/his or her team has to handle. In still another example, a user may wish to view a user interface that displays a list of software bugs identified in a given software product. Similarly, a user may wish to view a planner dashboard showing a plurality of tasks to be performed in different stages of completion.

Although such user interfaces typically display the data the user wishes to view, they do not do so in an efficient manner. The data may be displayed in a cluttered manner and/or in a manner that increases the cognitive burden on users and increases the time required to perform actions. Accordingly, it is desirable to have more efficient and improved graphical user interfaces that reduce the cognitive burden on users and/or reduce the time taken to perform tasks.

SUMMARY

Example embodiments described herein are directed to a computer-implemented method. The method includes receiving a user interface request to display a user interface of an issue tracking system (ITS) from a user device. The user interface displays a plurality of objects of the ITS. The user interface request includes a user identifier of a user of the user device and a user identifier of the requested user interface. The method further includes determining a time since the user last viewed the user interface, retrieving object data for the requested user interface based on the user interface identifier, retrieving activity data for the requested user interface based on the time since the user last viewed the user interface, and communicating the object data and activity data to the user device for displaying on the user device one or more objects of the plurality of objects of the ITS based on the object data and one or more activity indicators for the displayed one or more objects of the plurality of objects of the ITS based on the activity data.

Other example embodiments described herein are directed to another computer-implemented method. The method includes generating a request for displaying a user interface of an issue tracking system (ITS) that displays a plurality of objects of the ITS. The request includes an identifier of the user interface, and an identifier of the user of a user device. The method further includes communicating the request to a server and receiving object data and activity data from the server in response to the user interface request. The activity data indicates new activity in one or more objects of the plurality of objects since the user last viewed the user interface. The method further includes displaying the object data in a plurality of object cards; and using the activity data to display activity indicators against one or more object cards corresponding to the one or more objects that have new activity.

Some example embodiments are directed to a system. The system includes a processor and a non-transitory computer readable medium comprising instructions, which when executed by the processor, cause the system to perform the operations of the methods described above.

Other example embodiments are directed to non-transitory computer readable medium which when executed by a processor causes the processor to perform the methods described above.

Figure 1:
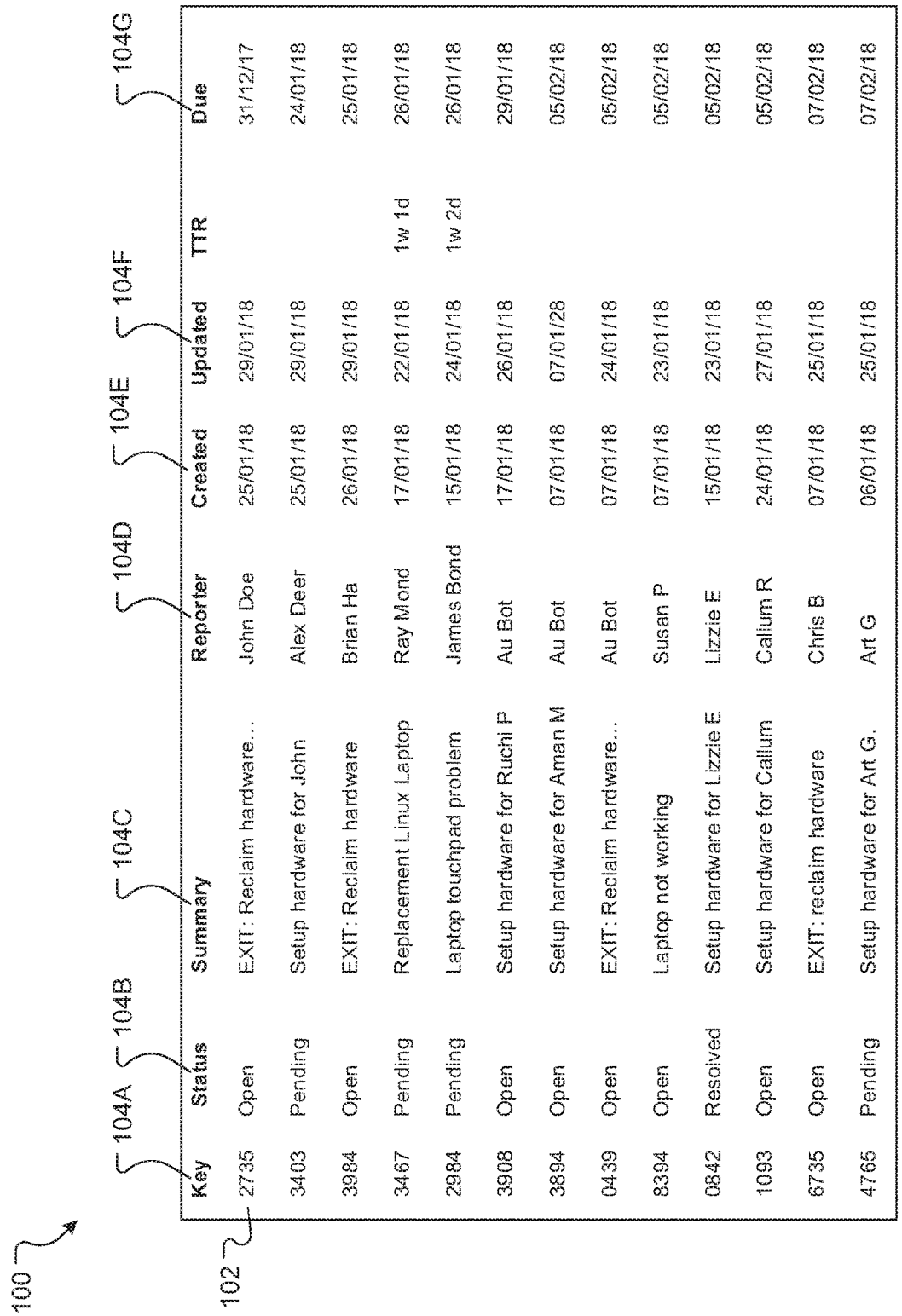
FIG. 1 illustrates a conventional issue panel.

While the description is amenable to various modifications and alternative forms, specific embodiments are shown by way of example in the drawings and are described in detail. It should be understood, however, that the drawings and detailed description are not intended to limit the embodiments to the particular form disclosed herein. The intention is to cover all modifications, equivalents, and alternatives falling within the scope of the present disclosure as defined by the appended claims.

DETAILED DESCRIPTION

In the following description, numerous specific details are set forth in order to provide a thorough understanding of the various embodiments disclosed herein. It will be apparent, however, that the embodiments disclosed herein may be practiced without these specific details. In some instances, well-known structures and devices are shown in block diagram form in order to avoid unnecessary obscuring.

For instance, the user interfaces of the present disclosure are described with reference to an issue tracking system (ITS) and in particular with reference to a user interface of an ITS system that displays a summary view of multiple issues belonging to a project or queue. It will be appreciated however that this is merely exemplary and that the teachings of the present disclosure can be adopted in user interfaces that display a plurality of items/resources/objects and their corresponding data for any software application and in any format. For instance, it may be used in user interfaces that display a list of documents hosted by a content management system. In fact, it may be used in any user interface that displays a plurality of objects that may be updated from time to time. For instance, aspects of the present disclosure may be utilized to display task cards in an object tracking system such as Trello, Microsoft Planner, and so on.

Overview

An ITS provides users with the ability to create and track issues—or, more generally, work items. A work item is an item with associated information and an associated lifecycle—i.e., a series of states through which the work item transitions over its lifecycle. The lifecycle for a given work item may be simple (e.g., an open state and a closed state) or more complex (e.g., open, closed, resolved, in progress, and reopened).

The particular information and lifecycle associated with a work item may vary greatly depending on the scenario in which the ITS is implemented. By way of example, an ITS may be implemented in a helpdesk scenario, in which case the work items may be issues or tickets logged with the helpdesk. An ITS may be implemented in a project management scenario, in which case the work items may be project tasks. An ITS may be implemented in a software development scenario, in which case work items may be bugs, current features under development, and/or features intended for further development. An ITS may be implemented in an organizational administration scenario, in which case work items may be administrative forms (e.g., leave request forms or the like). An ITS may be used in an organization's customer support center to create, update, and resolve reported issues by customers and/or employees. Many other ITS implementations in which different work items are tracked through different lifecycles are possible. For ease of reference, the following disclosure will refer to issues, however the features and operations described could apply to any other type of work item maintained by an ITS.

One example of an ITS with which the present disclosure may be implemented is Jira Service Management (JSM), which is commercially available from Atlassian. For the purposes of explanation the present disclosure will predominantly refer to JSM, however the features described herein could be applied to alternative issue tracking systems.

When an ITS is used to handle a small number of issues or work items at any given time, it is relatively easy to assign these work items to agents and easy for the agents to check and manage the issues assigned to them. However, when an ITS is used by a large organization to handles thousands if not hundreds of thousands of issues—management of issues becomes difficult. To help with this, some ITSs allow the creation and management of queues. A queue includes a list of issues that have one or more common underlying parameters, e.g., common location, common issue type, common priority type, etc. For example, a helpdesk ITS for a multi-national company with offices in New York, London, and Dubai, may setup three different queues—New York issues, London issues, and Dubai issues. New issues received or created by the ITS are then assigned to one of these queues depending on which office the issues related to. Similarly, organizations can create queues based on any other parameters such as issue types, issue priority, workflow status (e.g., open, unassigned, assigned, closed, resolved, in progress, reopened, and so on).

Even though queues help segregate issues, they may not completely help with reducing cognitive burden on the user. For example, in case a queue includes multiple issues, a user may have to review each issue in the queue frequently to determine the state of the issue (e.g., whether the issue has been resolved or is still pending, whether any new activity, such as a comment from a user has been submitted in the issue, and so on. The more issues included in a queue the more daunting the landing experience becomes for a new team member joining an existing queue, or even for existing team members.

FIG. 1 illustrates a conventional summary user interface 100. This user interface 100 may be the first interface an agent sees when they select a particular queue/project from a queue panel, a list of projects, a dropdown list, and so on. As seen in FIG. 1, the summary user interface 100 includes multiple issues belonging to a corresponding queue/project. For example, the summary user interface 100 may show a list of active issues belonging to the 'New York Pending' queue for a helpdesk ITS for a multi-national company. There may be thousands of issues in this queue which an agent may need to work through.

The issues 102 are shown in a table format in this example and for each issue, the table shows an issue identifier 104A, status 104B, summary 104C, reporter 104D, created date 104E, updated date 104F, and due date 104G. In other examples, there may be other issue-related information displayed in the user interface corresponding to each issue. For example, the user interface may also or alternatively display the agent an issue is assigned to, the project an issue belongs to, etc.

Typically, the summary user interface 100 displays all the active issues in a queue. And, agents typically do not have any control over the manner in which the issues are displayed in the user interface 100. Instead, the agent typically has to select an issue from the list of issues and view a detailed issue user interface to determine what has been updated and if there are any tasks for the agent to perform or not. Further, if a particular queue includes multiple OPEN or IN PROGRESS issues, the agent may have to view each such issue in a detailed user interface to determine whether any actions need to be taken.

Accordingly, the list of issues displayed in the user interface 100 may be cumbersome and cluttered, create an unsatisfactory UI experience and may increase the time taken by a user to manage issues and may increase the cognitive burden on the user. For example, an agent may not be able to easily navigate issues that have already been actioned or even decipher the priority of different issues.

To overcome one or more of these issues, aspects of the present disclosure provide more efficient issue management systems and methods. In some embodiments, the present disclosure provides mechanisms to declutter user interfaces that display a plurality of objects whose states may changes frequently such that users may experience a more efficient and visually decluttered interface that reduces the cognitive burden on users and produces a more engaging human machine interface. In particular, some aspects of the present disclosure replace the tabular structure of known conventional list-based UIs with flexible user interface formats that can be configured into different display formats to adapt to different ways of working. For example, the tabular structure can be replaced by a card-based design, such that each object is displayed in its own interactive and/or moveable card along with object data. By displaying object data in cards instead of a table reduces the amount of data displayed in the UI creating a more visually decluttered queue. Further, card-based design allows more space for specific issue fields, such as a description field, to be displayed in the summary user interface. This may be advantageous where teams deal with detailed descriptions and work could be expedited by reading these descriptions directly from the summary user interface without having to open the detailed view of the corresponding issues. Further, issue information displayed in the cards can be configurable, such that agents can customize their UIs to suit their needs. In another example, the tabular structure may be replaced by a calendar or timeline view that shows each object as an interactive card in a calendar or timeline. By displaying object data in a calendar or timeline view, users can quickly determine overdue issues/tasks and may be able to take action for them more effectively. Within the different configurable display formats, users may be able to further customize display by adjusting filters, sorting and other aspects like columns or date ranges, etc.

In some embodiments, the UI of the present disclosure displays updates in activity data of the individual objects in the UI. As used in this disclosure, activity data refers to any data that may indicate any type of activity associated with an object. In an ITS, activity data may include, e.g., new comments on issues, change in issue status, creation or closure of issues, mentions in an issue, new issue assignments of an issue to a user, and so on.

Different indicia or markers may be used to indicate different types of activity update data. For example, if an issue has been resolved, the color of the issue name or the issue card can be changed to a different color such as green. Similarly, if new unassigned issues exist in a queue, the issue names can be updated to bold and/or the issue card color can be updated to a different color, such as red. Additionally or alternatively, the shape, size or format of the issue card can be changed to highlight activity update data. If new comments have been an issue in the list includes new comments, a chat icon or emoji may be displayed next to the issue name, and so on.

Further, the UI as disclosed herein can be configured to show multiple types of activity data (such as change in issue status and/or new comments). The configuration may be performed by users or administrators. Further, it may be possible to show different types of activity data for objects belonging to different queues/projects. For instance, for objects belonging to one queue/project, the UI may display activity update data whenever the status of an object changes or a new unassigned object is added whereas for objects belonging to another queue/project, the UI may be configured to display activity update data whenever new comments are made with respect to an object or the user viewing the UI is mentioned.

In some embodiments, the activity data displayed in the issue UI may be configurable by the user such that the UI displays activity data that is important to that user.

The activity data may be updated based either on a polling method—where the client requests refreshes at fixed intervals or based on a publish-subscribe model—where the server sends updates to the client at fixed intervals or whenever there is a change. In either case, if a fixed interval is used, the refresh rates may be predetermined, set by an agent, or dynamically changed based on server loads—if the server load is below a threshold, refresh rates for different groups may be increased and if server loads are above a threshold, the refresh rates may be decreased.

In some embodiments, in addition to displaying updated activity data, the UI of the present disclosure may be configured to allow users to perform actions directly from the UI. For example, in the ITS example, users may be able to update an assignee of an issue or respond to a comment directly from the UI. This way, the user does not have to select an issue, view a detailed view of the issue and then update the assignee of the issue via the detailed view UI. This saves a number of key presses/clicks and reduces the need to request the server to provide and render the detailed view UI for an issue, thereby saving user and machine time, and processor and server utilization.

Figure 2:
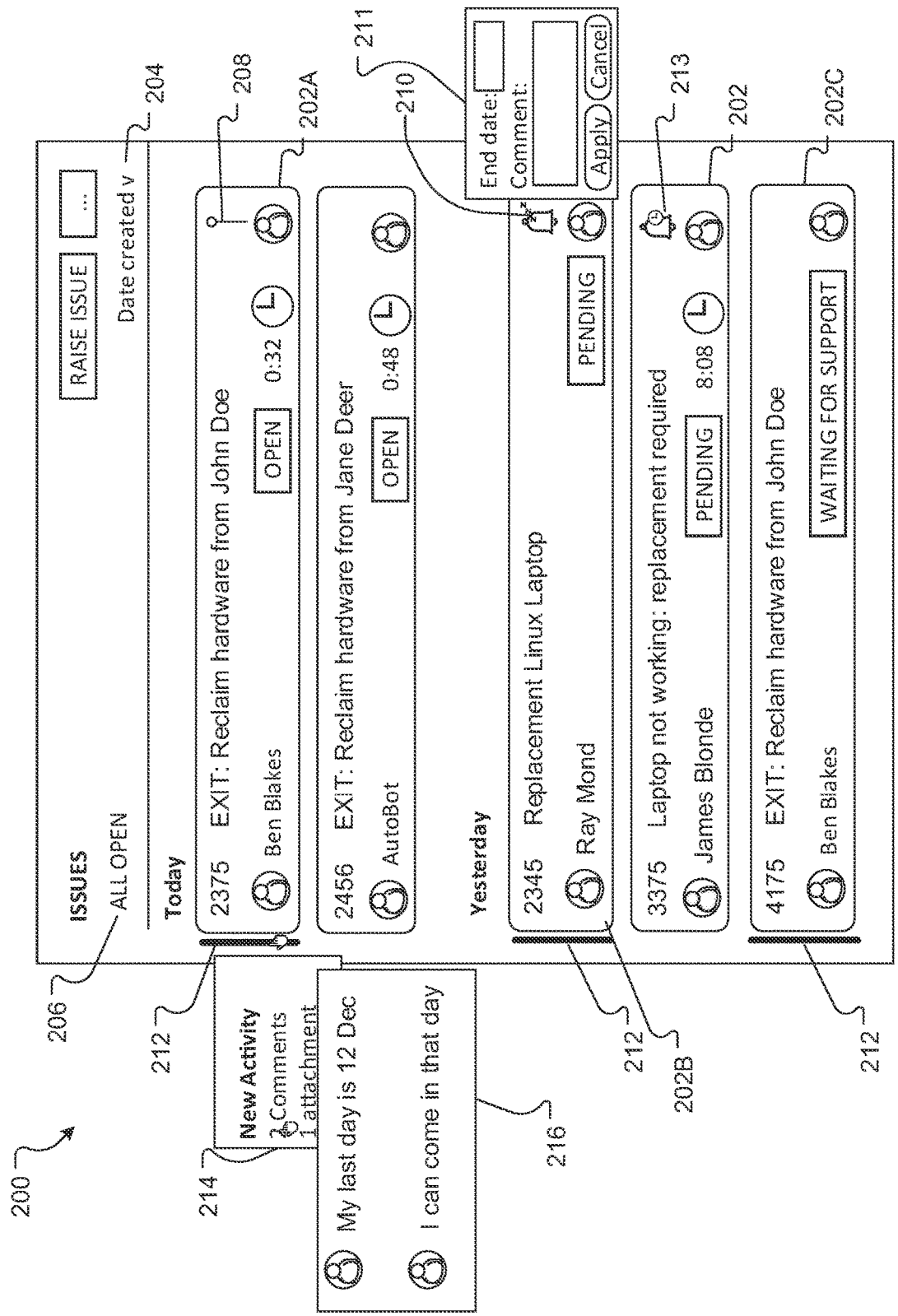
FIG. 2 illustrates an example summary user interface (UI) according to aspects of the present disclosure.

FIG. 2 shows an example summary UI 200 according to aspects of the present disclosure. The summary UI 200 displays a plurality of objects (e.g., issues in this example) as object cards 202. Further, the UI includes one or more sort controls 204 to allow the object cards to be sorted as desired. In the present example, the objects are sorted in date order (e.g., based on the date the issues were created). In other examples, the sort control 204 may allow the object cards 202 to be sorted in other date orders, such as date updated/modified. Sort controls 204 may be provided to allow the cards 202 to be sorted based on any other parameters such as status, time to resolution, reporter, etc.

Further, the UI 200 includes one or more filter controls 206 to allow the object cards 202 displayed in the UI 200 to be filtered based on a condition/parameter associated with the object or issue, such as issue status, issue creation/update date, time to resolution, assignee, reporter, etc.

The object cards 202 themselves show data about the corresponding object—including e.g., object identifier, object name, current status, time to resolution (if any), reporter and assignee. In addition, the object cards may include interactive controls (e.g., selectable affordances) that allow particular actions to be performed to the corresponding objects. For example, object cards 202 may include an interactive control 208 which when selected causes the card 202 to be pinned (such that it is displayed in the summary UI 200 irrespective of the filters applied or displayed at the top of the UI irrespective of the sort control 204 applied to the objects). In another example, the object cards 202 may include an interactive control 210 that allows the corresponding objects to be 'snoozed' or hidden from the summary UI 200. The snooze/hide control 210 may allow the user to snooze objects for a particular period (e.g., 1 day, 1 week, and so on) or until a particular activity occurs (e.g., issue status changes, issue is assigned to the user, comment is received, and so on). For example, an issue card associated with new hardware for a customer may be snoozed until the new hardware arrives. In some embodiments, when the snooze control 210 is selected a pop-up window 211 may be displayed that allows the user to input the end date or trigger condition for the snoozed object to be unsnoozed and optionally to provide a comment. The comment may be useful in case the snooze is applied for a long period and the user forgets why they had snoozed the object or in other cases where the snooze is applied to the object for the entire user's team.

In yet another example, the object cards 202 may include an interactive control 213 that allows a reminder to be set. For instance, a user may wish to set a reminder on an issue to follow-up with a customer after 5 days if no comments are received from the customer. In some cases, like the snooze control 210, when the reminder control 213 is selected, the corresponding object card 202 may be hidden from the user interface 200 until it is time for the reminder. In other cases, the object card may remain in the user interface 200.

In some embodiments, when the reminder control 213 is selected a pop-up window (not shown) may be displayed that allows the user to input the reminder date and reminder text. Then, on the reminder date, the reminder text may be displayed to the user in a suitable way—e.g., by showing the object card 202 with the reminder control highlighted. When a user hovers over the reminder control 213, a pop-up window may display the reminder text. Additionally or alternatively, a pop-up window with the reminder text may be displayed automatically when the user scrolls to the corresponding object card 202. In other examples, the reminder may be displayed as part of the activity update.

In this case, the user could activate the snooze feature for 5 days and add a note reminding the user to contact the customer once the issue card is 'unsnoozed'.

The summary UI 200 also displays an activity indicator 212 showing activity updates. In the UI displayed in FIG. 2, activity indicators 212 are displayed against object cards 202A, 202B and 202C indicating that some new activity has occurred in the corresponding objects (issues in this example UI). The activity indicator 212 is displayed as a solid line against a side of the object cards in this example. However, it will be appreciated that this is just one example of an activity indicator 212 and that in other examples, different visual indicators may be used without departing from the scope of the present disclosure. For example, in other embodiments, the activity indicator 212 may change the color of a corresponding object card 202, highlight the object card 202, and/or add a shape such as a star, or a circle in the object card or near the object card 202, change the shape, size, color of the object card, etc.

The aim of the activity indicator 212 is to quickly allow a user to scan the summary UI 200 and distinguish the objects that have had activity updates from the objects where no activity update has taken place. It may take any physical form to enable this.

In addition to indicating that activity updates are present for one or more objects, the UI 200 also displays information about the type of activity that has taken place. In the example shown in FIG. 2, when a user hovers over or selects the activity indicator 212, additional information about the activity update is presented in a pop-up window 214. In this example, the activity update information indicates that the issue includes two new messages and an attachment.

In some examples, the pop-up window 214 may include interactive information. For example, a user may be able to select or hover over the "2 Messages" text in the pop-up window 214, which in turn may cause a further pop-up window 216 to appear that shows the two new messages and may even allow the user to respond to the messages directly from the pop-up window. Similarly, if the user selects or hovers over the "1 attachment" text in the pop-up window 214, a preview of the attachment may be displayed to the user in a further pop-up window (not shown). This way, a user can review the updated object information directly from the summary UI 200 without having to inspect each object via the detailed object view UI. This not only saves user time but also saves processing and network bandwidth as the user device does not have to retrieve and display all the data for the object in the detailed view UI.

These and other features of the summary UI 200 will be described in detail in the following sections.

Environment Overview

Figure 3:
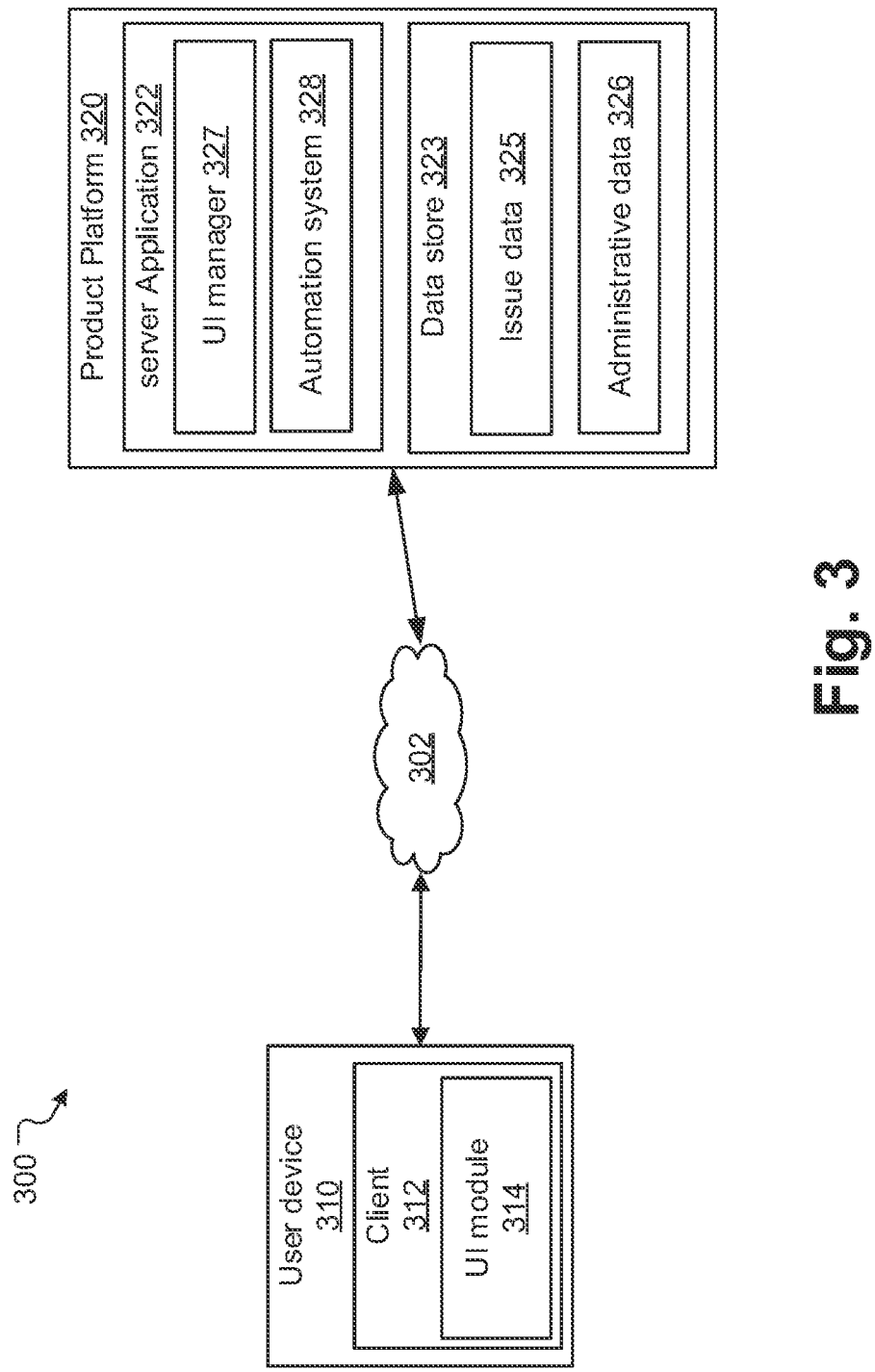
FIG. 3 is a block diagram depicting a networked environment in which various features of the present disclosure may be implemented.

FIG. 3 depicts an example networked environment 300 in which various operations and techniques described herein can be performed. Example environment 300 includes a communications network 302, which interconnects user device 310 and a product platform 320.

The user device 310 may be any device suitable for performing client-side operations described herein, for example a mobile device (e.g. a tablet or mobile phone), a portable device (such as laptop computer), or any other computing device (e.g. a desktop computer). While only one user device 310 have been illustrated, an environment would typically include multiple user devices 310 interacting with the product platform 320.

Users of the user device 310 are associated with one or more user accounts and generate and/or communicate electronic content to the product platform 320. This includes any type of user account interaction with the product platform 320, including, for example, interacting with (i.e., sending data to and receiving data from) product platform 320, and viewing or interacting with summary UIs (such as summary UI 200) displayed on a display of the user device 310.

In order to allow users to perform these functions, as illustrated in FIG. 3, the user device 310 includes one or more client (software) applications (e.g., client 312) that is configured to access applications made available by the product platform 320. The client 312 may communicate with the application hosted by the product platform 320, render user interfaces (e.g., the summary UI 200) based on instructions received from the product platform server 322, and receive inputs from user accounts allowing them to interact with the applications hosted by the product platform 320.

The client 312 includes instructions and data stored in the memory (e.g. non-transitory compute readable media) of the user device 310 on which the application is installed/run. These instructions are executed by a processor of the user device 310 to perform various functions as described herein. By way of example, some functions performed by the client 312 include communicating with the software application hosted by the product platform 320, rendering user interfaces (e.g., showing issue data) based on instructions received from the product platform 320, receiving inputs from users to interact with user interfaces made available by the product platform 320, and communicating user inputs to the product platform 320 to update data managed by the product platform 320.

The client 312 further includes an UI module 314 configured to manage summary UIs. In particular, the UI module 314 may be configured to communicate with the product platform 320 to receive e.g., issue data and activity update data for display in a summary UI, to receive user inputs in the summary UI, and to perform actions based on user inputs.

The client 312 may be implemented in various ways. For example, the client 312 may be a web browser application, which accesses the applications hosted by the product platform 320 via appropriate uniform resource locators (URL) and communicates (using a communication interface such as 418 described below) with the product platform 320 (and, in particular, the server application 322) via general worldwide-web protocols. In this case, the web browser application is configured to request, render and display user interfaces that conform to a mark-up language, and may be capable of internally executing browser-executable code, or other forms of code. Alternatively, the client 312 may be a specific application programmed to communicate with the product platform 320 using defined application programming interface (API) calls.

The product platform 320 may be a system or set of systems configured to provide any type of service/perform any type of operations for clients 112. In order to provide such services/operations, product platform 320 stores object data in an object data store 323. As one example, product platform 320 may be an ITS used (inter alia) to create, manage, and track issues. Product platform 320 may, however, provide other services/perform other operations. In the present example, product platform 320 includes a server application 322.

Server application 322 is executed by a computer processing system to configure that system to provide server-side functionality to one or more corresponding client applications 312—e.g., by receiving and responding to requests from client applications 312, storing/retrieving data from the data store 323, and performing other operations as described herein. Server application 322 comprises one or more application programs, libraries, APIs or other software elements that implement the features and functions that are described herein. For example, where the client application 312 is a web browser, the server application 322 is a web server such as Apache, IIS, nginx, GWS, and/or an alternative web server. Where the client application 312 is a specific/native application, server application 322 is an application server configured specifically to interact with that client application 312.

In one example, the server application 322 includes a UI manager 327 configured to manage the display of summary UIs. In particular, the UI manager 327 may be configured to communicate with the UI module 314 of user devices 310, retrieve, e.g., summary data and activity data from data store 324, communicate summary data and activity data to the UI module 314 for rendering on the user devices, perform actions based on user input received in summary UIs from user devices 310, etc. The server application 322 may further include an automation module 328 that is configured to monitor trigger conditions for snoozed object cards and/or reminders, to determine when unsnoozing or reminder conditions are met, schedule unsnoozing/reminder events, and communicate unsnoozing/reminder events to the UI manager 327 once the unsnoozing/reminder events have occurred. The UI manager 327 in turn can remove corresponding issue/reminder data from the data store 323.

The data store 323 is used to store data related to the product platform application. For example, in case the product platform is an ITS, the data store may include, e.g., data defining the operation of the ITS application (for example, user accounts, user permissions, and the like) as administrative data 326; and issue data 325 (e.g., issue name, issue ID, issue status, issue workflows, and so on).

The issue data 325 may include one or more data structures, for example, including issue data (e.g., issue identifier, issue name, date created, reporter, assignee, and so on). These data structures will be described in more detail below.

The data store 323 may be provided by a database server (not shown) which may be hosted by server 322, but is more typically hosted on a separate physical computer in communication (directly or indirectly via one or more networks 302) with the server 322. While a single data store 323 is described, multiple separate data stores could be provided.

While single server architecture has been described herein, it will be appreciated that the server 322 and data store 323 can be implemented using alternative architectures. For example, in certain embodiments, the product platform 320 is a scalable system including multiple distributed server nodes connected to one or more shared data stores (e.g. shared file servers). Depending on demand from clients (and/or other performance requirements), product platform 320 server nodes can be provisioned/de-provisioned on demand to increase/decrease the number of servers offered by the product platform 320. Each server 322 may run on a separate computer system and include one or more application programs, libraries, APIs or other software that implement server-side functionality. Similarly, the data store 323 may run on the same computer system as an server application 322, or may run on their own dedicated system(s) (accessible to server application(s) 322 either directly or via a communications network).

Communications between the various systems in environment 300 are via the communications network 302. Communications network may be a local area network, public network (e.g., the Internet), or a combination of both.

While environment 300 has been provided as an example, alternative system environments/architectures are possible.

Hardware System

The embodiments and features described herein are implemented by one or more special-purpose computing systems or devices. For example, in environment 300 each of the user devices 310 and the product platform 320 is or includes a type of computing system.

A special-purpose computing system may be hard-wired to perform the relevant operations described herein. Additionally or alternatively, a special-purpose computing system may include digital electronic devices such as one or more application-specific integrated circuits (ASICs) or field programmable gate arrays (FPGAs) that are persistently programmed to perform the relevant operations. Alternatively, a special-purpose computing system may include one or more general-purpose hardware processors programmed to perform the relevant operations pursuant to program instructions stored in firmware, memory, other storage, or a combination.

A special-purpose computing system may also combine custom hard-wired logic, ASICs, or FPGAs with custom programming to accomplish the relevant operations described herein. A special-purpose computing system may be a desktop computer system, a portable computer system, a handheld device, a networking device or any other device that incorporates hard-wired and/or program logic to implement relevant operations.

Figure 4:
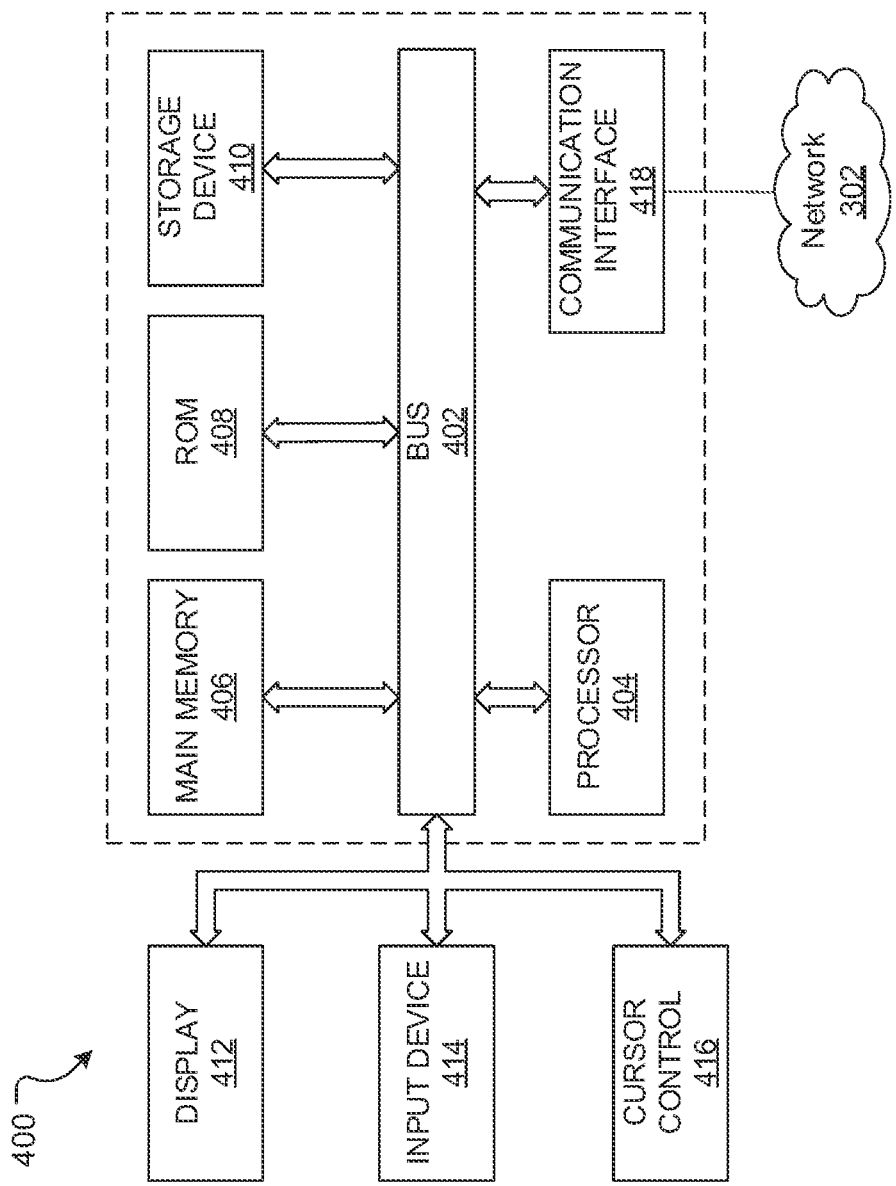
FIG. 4 is a block diagram of a computer processing system configurable to perform various features of the present disclosure.

By way of example, FIG. 4 provides a block diagram that illustrates one example of a computer system 400, which may be configured to implement the embodiments and features described herein. Computer system 400 includes a bus 402 or other communication mechanism for communicating information, and a hardware processor 404 coupled with bus 402 for processing information. Hardware processor 404 may be, for example, a general-purpose microprocessor, a graphical processing unit, or other processing unit.

Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Such instructions, when stored in non-transitory computer readable media accessible to processor 404, render computer system 400 into a special-purpose machine that is customized to perform the operations specified in the instructions.

Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

In case the computer system 400 is the user device 310, the computer system 400 may be coupled via bus 402 to a display 412 (such as an LCD, LED, touch screen display or other display), for displaying information to a computer user. An input device 414, including alphanumeric and other keys, may be coupled to the bus 402 for communicating information and command selections to processor 404. Another type of user input device is cursor control 416, such as a mouse, a trackball, or cursor direction keys for communicating direction information and command selections to processor 404 and for controlling cursor movement on display 412.

According to one embodiment, the operations described herein are performed by computer system 400 in response to processor 404 executing one or more sequences of one or more instructions contained in main memory 406. Such instructions may be read into main memory 406 from another storage medium, such as a remote database. Execution of the sequences of instructions contained in main memory 406 causes processor 404 to perform the process operations described herein. In some embodiments, hard-wired circuitry may be used in place of or in combination with software instructions.

The term "storage media" as used herein refers to any non-transitory computer readable media that stores data and/or instructions that cause a machine to operate in a specific fashion. Such storage media may comprise non-volatile media and/or volatile media. Non-volatile media includes, for example, optical or magnetic disks, such as storage device 410. Volatile media includes dynamic memory, such as main memory 406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from, but may be used in conjunction with, transmission media. Transmission media participates in transferring information between storage media. For example, transmission media includes coaxial cables, copper wire, and fiber optics, including the wires that comprise bus 402. Transmission media can also take the form of acoustic or light waves, such as those generated during radio wave and infrared data communications.

Computer system 400 also includes a communication interface 418 coupled to bus 402. Communication interface 418 provides a two-way data communication coupling to a communication network, for example communication network 302 of environment 300. For example, communication interface 418 may be an integrated services digital network (ISDN) card, cable modem, satellite modem, etc. As another example, communication interface 418 may be a local area network (LAN) card to provide a data communication connection to a compatible LAN. Wireless links may also be implemented. In any such implementation, communication interface 418 sends and receives electrical, electromagnetic, or optical signals that carry digital data streams representing various types of information.

Computer system 400 can send messages and receive data, including program code, through the network(s) 302 and communication interface 418.

As noted, computer system 400 may be configured in a plurality of useful arrangements, and while the general architecture of system 400 may be the same, regardless of arrangements there will be differences. For example, where computer system 400 is configured as a server computer (e.g. such as product platform 320), it will typically be provided with higher end hardware allowing it to process data, access memory, and perform network communications more rapidly than, for example, a user device (such as user device 310).

Example Data Structures

This section describes some of the data structures maintained in the data store 323. In this example, the product platform is assumed to be an ITS and the data store 323 is assumed to store issue-related data structures. The data structures and fields described below are provided by way of example. Depending on the implementation, additional, fewer, or alternative fields may be used. Further, the fields described in respect of a given data structure may be stored in one or more alternative data structures (e.g., across multiple linked data structures). Although tables are used to illustrate the data structures, the relevant fields/information may be stored in any appropriate format/structure.

Figure 5:
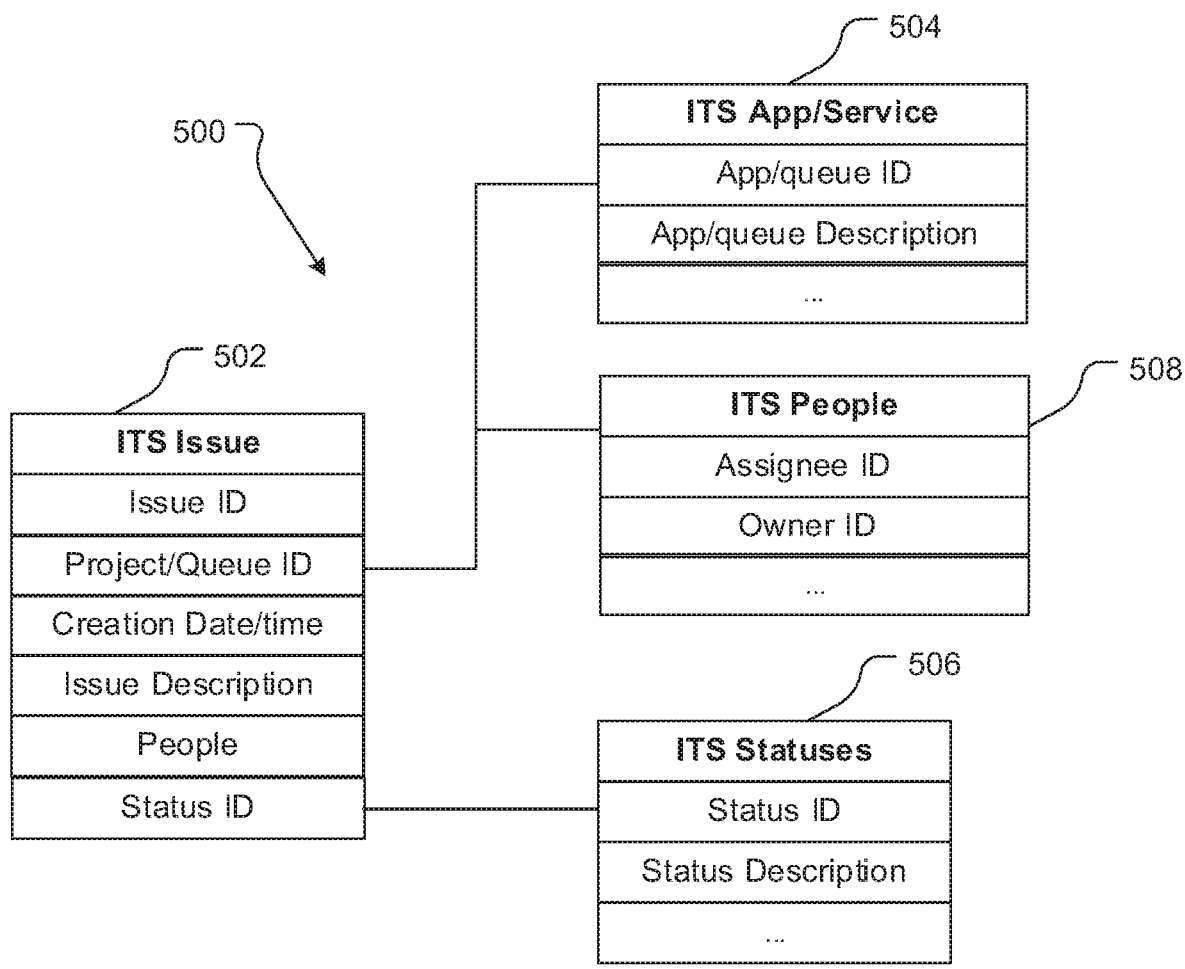
FIG. 5 illustrates is an example database schema.

An ITS may maintain a list of issues in a variety of data structures. In one embodiment, issues are stored in a relational database (e.g., in data store 323). By way of illustration, FIG. 5 provides a partial example of a simple relational database schema 500 for an ITS. In this example, schema 500 includes: an issue table 502 comprising an issue ID field, an application/service ID field, a timestamp of when the issue was created, a status ID field, an issue summary field; an application/service table 504 comprising an application/service ID field, and an application/service description; a status table 506 comprising a status ID field and a status description field; and a people table 508 comprising an assignee ID field, an owner ID field, and a reporter ID field.

Schema 500 has been provided for descriptive purposes, however a relational database schema for an ITS is typically considerably more complex and can have additional/different tables with additional/alternative fields and linked in alternative ways. Furthermore, different data structures entirely could, in some cases, be used. For example, issues could be stored in a single table data structure (which may be appropriate for relatively simple ITSs) where the single table stores all relevant issue data. The table below provides an example of a simple single table data structure for storing issues:

TABLE A

| | | Example issue data structure | | | | |
|---|---|---|---|---|---|---|
| Key | App/Service ID | Description | Status | Priority | Date/time | . . . . . . |

In addition to the general issue data described above—that applies to all users that wish to view issue data, the schema 500 may also store issue data that pertains to specific users or teams. For example, the schema 500 may include a relational table associated with each issue that includes pinned data. For instance, the relational table may include identifiers of users/teams that may have pinned the corresponding issue in their summary user interfaces. Table B shows an example of one such database below—

TABLE B

Example pin database associated with a given issue

| User Identifier | Context Identifier |
|---|---|
| 879483 | Queue 44 |
| 242340 | Queue 12 |
| 242340 | Queue 22 |
| Team_abc | Queue 11 |

Each such table may be associated with a given issue.

Similarly, the schema 500 may include another relational table associated with each issue that includes snooze data. For instance, the relational table may include identifiers of users/teams that may have snoozed the corresponding issue in their summary user interfaces. Table C shows an example of one such database below—

TABLE C

Example snooze database associated with a given issue

| User Identifier | Context Identifier | Snooze Start time | Snooze duration | Snooze trigger | Comment |
|---|---|---|---|---|---|
| 879483 | Queue 44 | 23, Dec. 2021 10:00:01 | 5 days | — | Snoozed as hardware not expected until next Monday |
| Team_abc | Queue 12 | 21, Dec. 2021 | | Hardware asset field updated | Snoozed until hardware received |
| 242340 | Queue 22 | 1, Dec. 2021 | 5 days | | Snoozed until hardware arrives |
| Global | Queue 11 | 28, Nov. 2021 | | Hardware asset field updated | — |

Each such table may be associated with a given issue. As seen in this example, the same issue may be snoozed by particular users in their queues or it may be snoozed globally by an administrator. If a user snoozes an issue before it has been globally snoozed, the user specific snooze may be maintained in the table or it may be removed.

A similar relational table may be maintained for reminder data. For instance, the relational table may include identifiers of users/teams that may have set reminders for the corresponding issue in their summary user interfaces. Table D shows an example of one such database below—

TABLE D

Example reminder database associated with a given issue

| User Identifier | Context Identifier | Reminder Start time | Reminder duration | Reminder message |
|---|---|---|---|---|
| 879483 | Queue44 | 23, Dec. 2021 10:00:01 | 5 days | Check if customer has responded |
| 342649 | Global | 21, Dec. 2021 | 10 days | Check if David has returned the laptop |

Each time a user or administrator pins, unpins, snoozes, or sets a reminder on a given issue, the issue identifier and the corresponding action data is communicated to the server 322, which communicates the data to the data store 323 to update the corresponding table B, C or D. For example, if an issue is pinned, snoozed or a new reminder is set, a new record may be added in table B, C, and/or D of the given issue. Additionally or alternatively, if an issue is unpinned, an unsnooze or reminder condition has been met (as determined by the automation module 328), the corresponding record from table B, C, or D is removed.

It will be appreciated that although the pinned, snooze and reminder data is shown as being stored along with issue data in the issue schema 500, this need not always be the case. In other implementations, the server 322 may maintain independent data tables for pinned, snooze and reminder data. In such cases, the data tables may also include the issue identifier and/or project identifier in each record.

Example Methods

Figure 6:
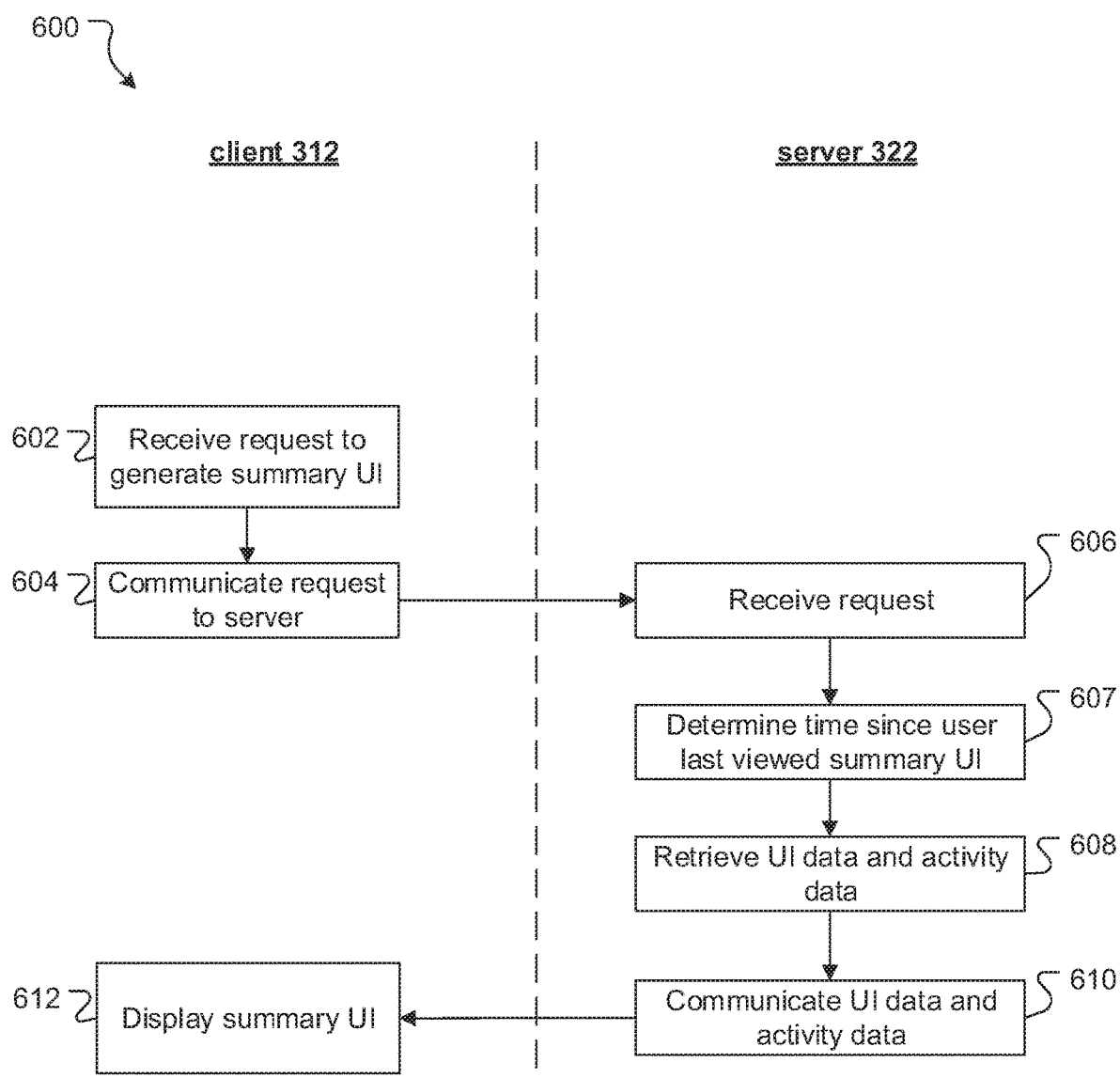
FIG. 6 is a flowchart illustrating an example method for displaying a summary UI according to aspects of the present disclosure.

FIG. 6 is a flowchart illustrating an example method for displaying a summary UI according to some aspects of the present disclosure. The methods are also described with reference to an ITS as the product platform 320, issues as the items/objects/resources maintained by the product platform and issue data as the item/object/resource data displayed in the summary UI 200. However, it will be appreciated that this is an example. The method 600 commences at operation 602, where the user device 310 receives a request to display a summary UI. This request may be received in a number of different ways.

In one example, a user may be viewing a queue panel/user interface that displays a plurality of issue queues. The user may then wish to view one of the issue queues and may select the particular issue queue. Selection of the issue queue results in generation of a summary UI request. In another example, a user may be viewing a user interface displaying a plurality of projects and may select a project. This selection causes generation of a summary UI request. In another example, a user may have bookmarked or otherwise saved the URL for the summary page of a particular issue queue/project. In this example selecting the bookmark or entering the URL in the address bar or a web browser may result in the summary UI request being generated.

At operation 604, the UI request is communicated to the product platform 320 (e.g., ITS). In one example, the UI request includes a unique identifier of the user interface for which the summary is requested, and a unique identifier of the user making the request. In case the user interface is displayed by an ITS, the user interface identifier may be a queue/project identifier. In addition, in some embodiments, the request may include a timestamp indicating the time since the user last viewed the UI. It will be appreciated that in some cases, the user may have selected one or more filters in their UI 200. In such cases, the UI request also includes data about the filter applied by the user. This data may be saved in the UI module 314. If the UI allows pinning of issue cards, the UI request may include a request for the 'pin' field data to be returned along with issue data such that the client 312 can identify and distinguish pinned data.

At operation 606, the UI manager 327 receives the request and at operation 607 the UI manager 327 determines a time since the user last viewed the requested summary UI. In some embodiments, this determination may be made based on the timestamp received from the user device 310. In other embodiments, the UI manager 327 may save a data structure that stores data indicating the last time a user viewed a given summary UI. Table E shows an example data structure that store the user identifier, UI identifier, and last viewed timestamp.

TABLE E

| Example last viewed data structure | | |
| --- | --- | --- |
| User ID | UI ID | Time last Viewed |
| 327463872 | Queue: 44 | 23, Dec. 2021 10:10:00 |
| ... | ... | ... |

In one example, whenever the UI manager 327 receives a request to view a given summary UI (e.g., associated with a given queue or project), it may inspect the data structure to check if a record already exists for the given user identifier and summary UI identifier. If a record exists, the UI manager 327 may update the timestamp in the record based on the current time. If a record does not exist for that user identifier and summary UI identifiers, a new record is added in the data structure and the current time is added as the last viewed timestamp. By storing the last viewed data structure in the server 322, the system can determine when a user last viewed a particular UI on any device.

At operation 608, the UI manager 327 retrieves object data (e.g., issue data) for the requested summary UI. The object data corresponds to the data displayed in the object cards 202. In one example, the UI manager 327 creates a search query based on the received UI identifier (e.g., project/queue identifier) and uses this to query the issue data structure 500. In case the UI request also includes filter data, this data may be added to the search query such that issues that match the filter criteria are returned. For example, if the filter criteria is all pending issues, the UI manager 327 can update the search query to include, e.g., AND (Issue status="pending").

If the UI also includes other UI configurable options such as pinning or snoozing, the UI manager 327 may update the search query such that issues pinned by the user or the user's team are returned or issues snoozed by the user and/or the user's team are not returned with the search results. For example, the search query can be updated to add e.g., 'AND (snoozes !=currentUser( ) OR snoozes !="ALL")'). Similarly pinned issues would be part of a union in the query (e.g., 'OR (pins=pinUserAndContext(currentUser( ) "queue: 42")').

Once the issue identifiers are retrieved, the UI manager 327 can query the ITS issue data structure 500 to retrieve data that is to be displayed in the object cards 202 for each issue. In some examples, the client 312 may specify the issue data fields to be retrieved. In other examples, the UI manager 327 may have a list of data fields that are to be displayed in the cards—these may be default fields—and may query the data structure 500 with the issue identifiers and the data fields (self-supplied or received from the client 312) to retrieve data corresponding to the fields displayed in the issue card. This data may be packaged and communicated to the user device 310.

In addition to the issue information, at operation 608, the UI manager 327 also determines activity update data for the retrieved active issues. In one example, the activity update data is determined based on the last viewed date/time determined at operation 607 and the updated date/time associated with the active issues. If the updated date/time of the issue is after the last viewed date/time, the UI manager 327 determines that the corresponding issue has been updated since the user last viewed the issue and may add the issue identifier of that issue to an activity update list. This check is performed for all the active issues identified at operation 606. The update list may include issues that were created after the time the user last viewed the summary UI. It will be appreciated that if an issue has been pinned, unpinned, or unsnoozed since the last time the user viewed the summary UI 200, the pinning, unpinning or unsnoozing may be reflected as an update in the issue data and if the corresponding issue identifier matches the search query criteria, this pinning, unpinning, or unsnoozing may be added as activity update data. Similarly, if a reminder condition is met since the last time the user viewed the summary UI 200, the reminder may be reflected as an update in the issue data and if the corresponding issue identifier matches the search query criteria, the reminder may be added as activity update data.

In one example, the activity data may simply include the update list of issue identifiers for which activity updates are present. This may be useful in cases where the UI includes an activity indicator that is separate from activity information. In such cases, the UI manager 327 may initially communicate the update list of issue identifier as part of the activity update data and this may be used by the client 312 to display activity indicators 212 for issue cards that have corresponding updates. If the user wishes to view the activity data in detail, the user may hover over or select the corresponding activity indicator 212, which can initiate a second request to the server 322 and in particular to the UI manager 327 to retrieve and communicate information about the activity that has been updated.

In other examples, the activity data may include a list of issue identifiers for which activity updates are present and information about the various changes that have occurred in the issue since the user last viewed the summary UI. For example, this information may include a count of the number of messages/comments made in the issue, any change in issue status or issue assignment, the content of the new messages/comments, new documents/attachments added to the issue, any pinning, unpinning, unsnoozing of issue cards, any reminders, etc.

In either case, at operation 610, the UI manager 327 communicates the issue data and activity update data to the client 312 for display on the user device 310.

At operation 612, the user device receives the issue data and activity data and generates the summary UI (e.g., such as summary UI 200). In particular, the client 312 generates issue cards based on the received issue data and generates activity indicators 212 based on the list of issues received in the update list. Additionally or alternatively, the client 112 may display activity data in any other suitable manner. For example, new messages/comments may be displayed via a highlighted chat icon in a corresponding card, changes in issue status may be displayed in a different color, content of new messages or new documents may be displayed in pop-up windows, pinning/unpinning may be shown by highlighting the pin affordance 208, unsnoozing may be shown by highlighting the issue card and the snooze control 210 and a reminder may be shown in a pop-up when the user hovers over the corresponding issue. If the UI manager 327 communicates additional activity data (e.g., in the form of JAVASCRIPT components), the client 312 may download and execute these components and store the executed components in a local cache for display when the user hovers over or selects a corresponding activity indicator 212.

In this manner, aspects of the present disclosure can display a summary UI on a user device.

Figure 7:
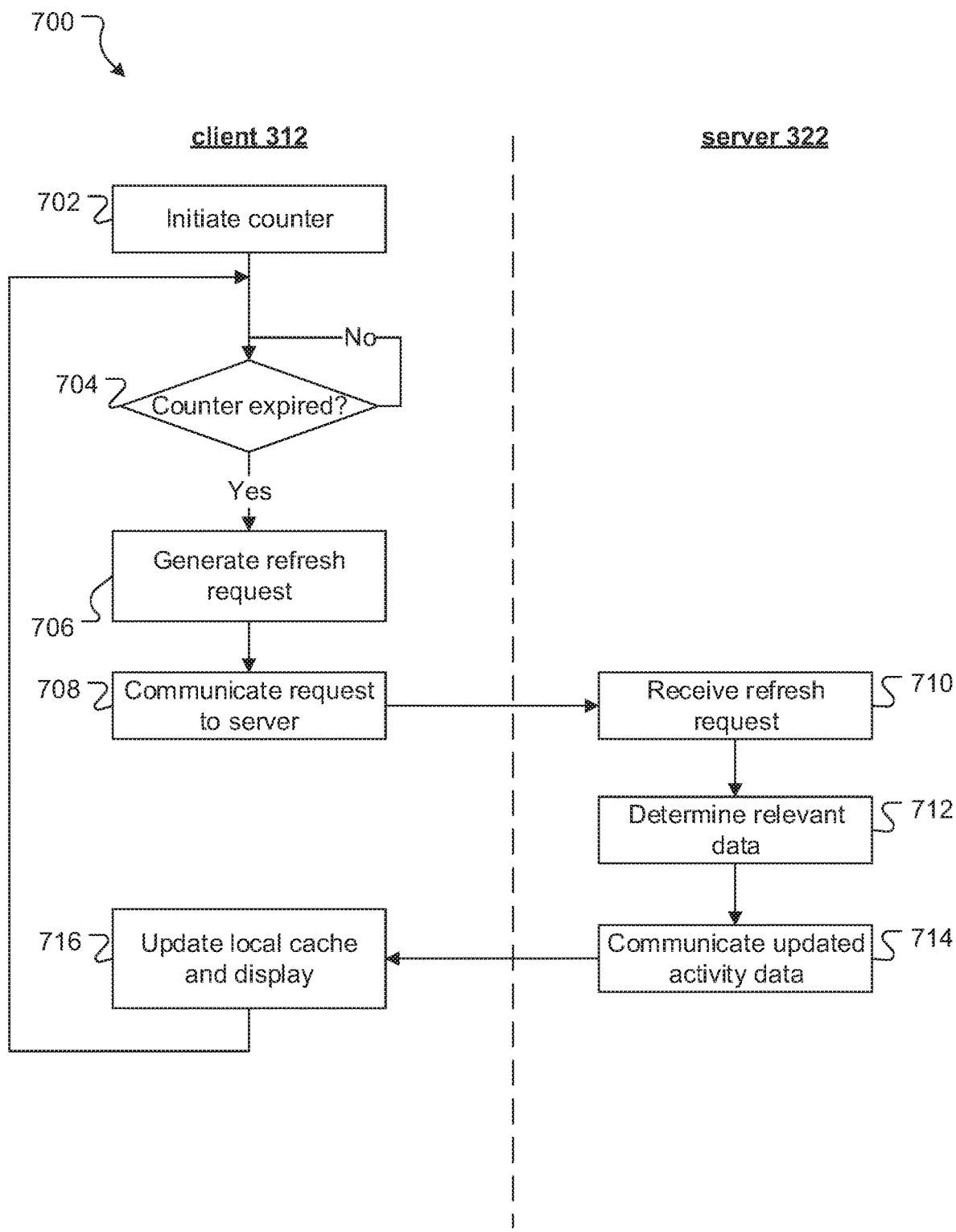
FIG. 7 is a flowchart illustrating an example method for refreshing the summary UI according to aspects of the present disclosure.

FIG. 7 is a flowchart illustrating an example method 700 for displaying issue updates while the user is viewing a summary UI. In particular, it provides a method for updating activity data for displayed issues in real time while the summary UI is being displayed on a user device 310.

In some examples, the UI manager 327 pushes issue updates to the user devices either in real time (i.e., whenever an issue is updated) or at predetermined intervals (e.g., every 10 seconds, every 60 seconds, and so on). In other cases, the client 312 may pull issue updates from the ITS in real time, e.g., by utilizing web hooks (programmed into the software application hosted by the ITS) that notify the client 312 when issue updates are available at the ITS or by requesting the ITS at predetermined intervals (e.g., every 30 seconds, every minute, every 5 minutes, etc.) to provide issue updates that were generated in that interval.

Method 700 describes one example method for displaying issue updates based on the client 312 generating and communicating update requests to the ITS at predetermined intervals. However, it will be appreciated that the method 700 can be amended slightly to be able to display issue updates according to any of the other push or pull techniques described above.

The method commences at operation 702, where the UI module 314 initiates a counter for the predetermined interval of time.

Next, at operation 704, the UI module 314 determines whether the counter has expired.

If the UI module 314 determines that the counter has not expired, the method returns to operation 704.

Additionally or alternatively, if the UI module 314 determines that the counter has expired, the method proceeds to operation 706.

At operation 706, the UI module 314 generates a refresh request for the summary UI. The refresh request includes queue/project identifier associated with the summary UI, identifiers of any filters implemented by the user, an identifier of the user making the request, a time stamp corresponding to the time the UI was previously updated.

It will be appreciated that agents may not wish to be informed of all issue updates. For example, agents may not be interested in receiving updates if the number of minutes since the issue has been active is updated. Similarly, an agent may not be interested in receiving updates for actions performed by that agent. However, they may be interested in receiving updates when other agents have performed actions or customers have commented on issues, if the state of an issue changes, etc. Accordingly, either the agents or administrators may configure the summary UI such that it only displays activity indicators 212 when relevant updates occur. Accordingly, the refresh request may further include a list of data fields for which activity update data is requested.

At operation 708, the refresh request is communicated to the server 322 and in particular the UI manager 327.

Next, at operation 710, the UI manager 327 receives the refresh request and at operation 712 the UI manager determines the activity data update for the requested queue/project. To this end, the UI manager 327 may query the data store and in particular, the issue data 325 in the data store 323 to retrieve the activity update data for the requested queue. In one example, it may identify the issues that have been updated by comparing the timestamp received from the client 312 with the latest updated timestamp of the corresponding issues. If the updated timestamp indicates a time after the time indicated by the timestamp received from the client, the UI manager 327 determines that the corresponding issue has been updated. It may also determine whether the updated data fields of these updated issues match one or more of the data fields received from the client 312 in the refresh request. If the updated data fields match the one or more received data fields, the corresponding issue identifiers are added to the activity update data. The UI manager 327 performs this identification for all the issues corresponding to the queue/project identifier. Further, for the issues that were updated since the last refresh request and that match the received data fields, the UI manager may determine whether the user requesting the update made any of those updates. This may be done by comparing the user identifier received as part of the refresh request with the user identifiers of users that last updated the given issues. If any issues are identified in this check as being updated by the requested user, those issue identifier can be removed.

In some cases, the update information may also be added to the activity update data.

If a new issue has been added to the queue/project since the last time the client 312 requested an update, the create date/time of the issue will be after the time indicated in the timestamp received from the client 312. In this case, the UI manager 327 may also retrieve issue data corresponding to the newly added issue and add it to the activity update data.

Once the requested activity update data for the queue/project is determined and retrieved, the UI manager 327 communicates the activity update data back to the client 312 (at operation 714). In one example, the response includes the queue/project identifier and the corresponding activity data update.

At operation 716, once the client 312 and in particular the UI module 314 receives the updated activity data from the server 322 it updates the local cache (if required, e.g., if in addition to the issue identifiers the activity update data includes the actual update information) and updates the summary UI. For example, for issues that had previously not been updated, but have been updated now, the UI module 314 may display an activity indicator 212. For new issues, it may generate and display a new issue card and (in some examples) an activity indicator 212.

The method then returns to operation 704.

Figure 8:
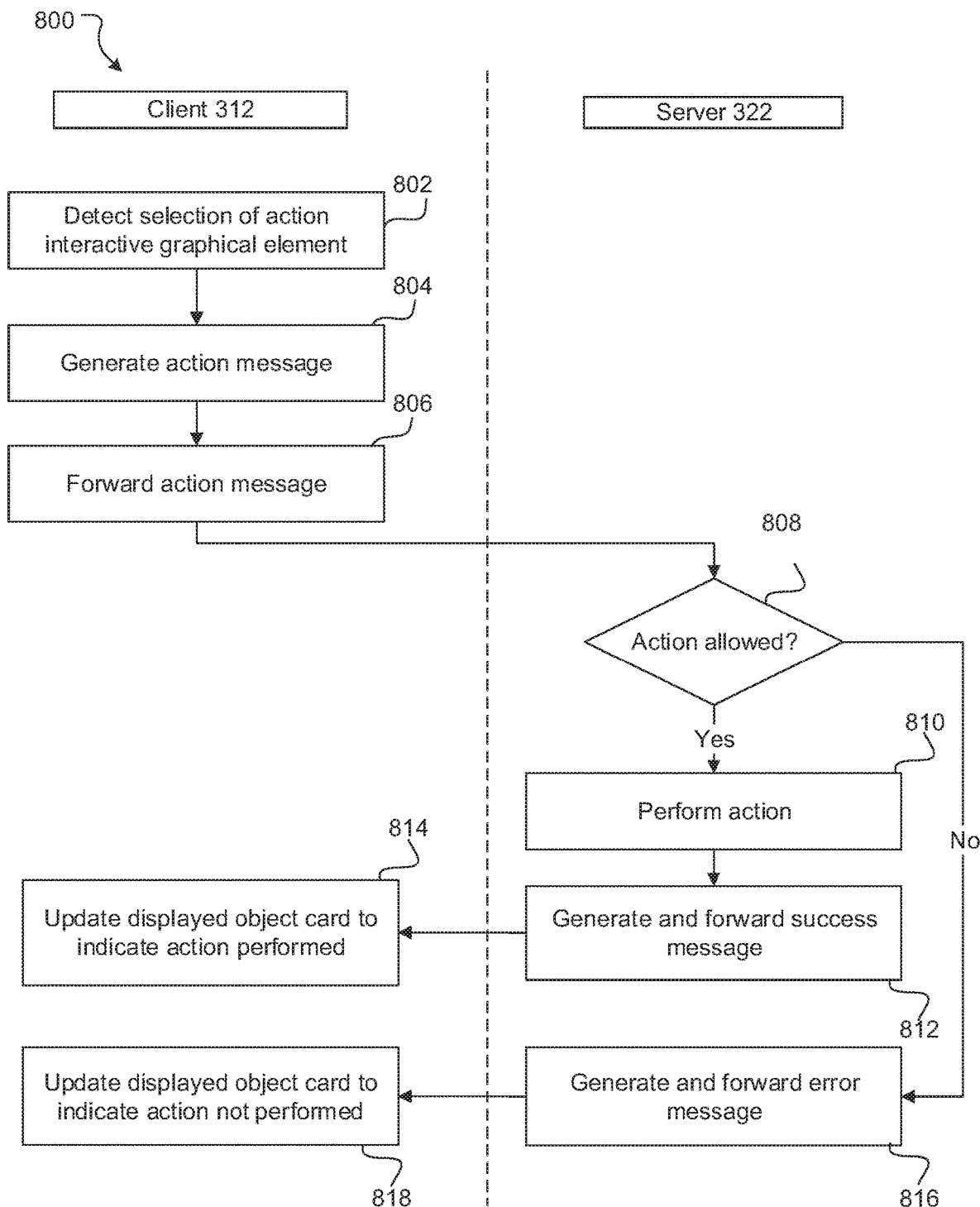
FIG. 8 is a flowchart illustrating an example method for performing an action via the summary UI according to aspects of the present disclosure.
Figure 9:
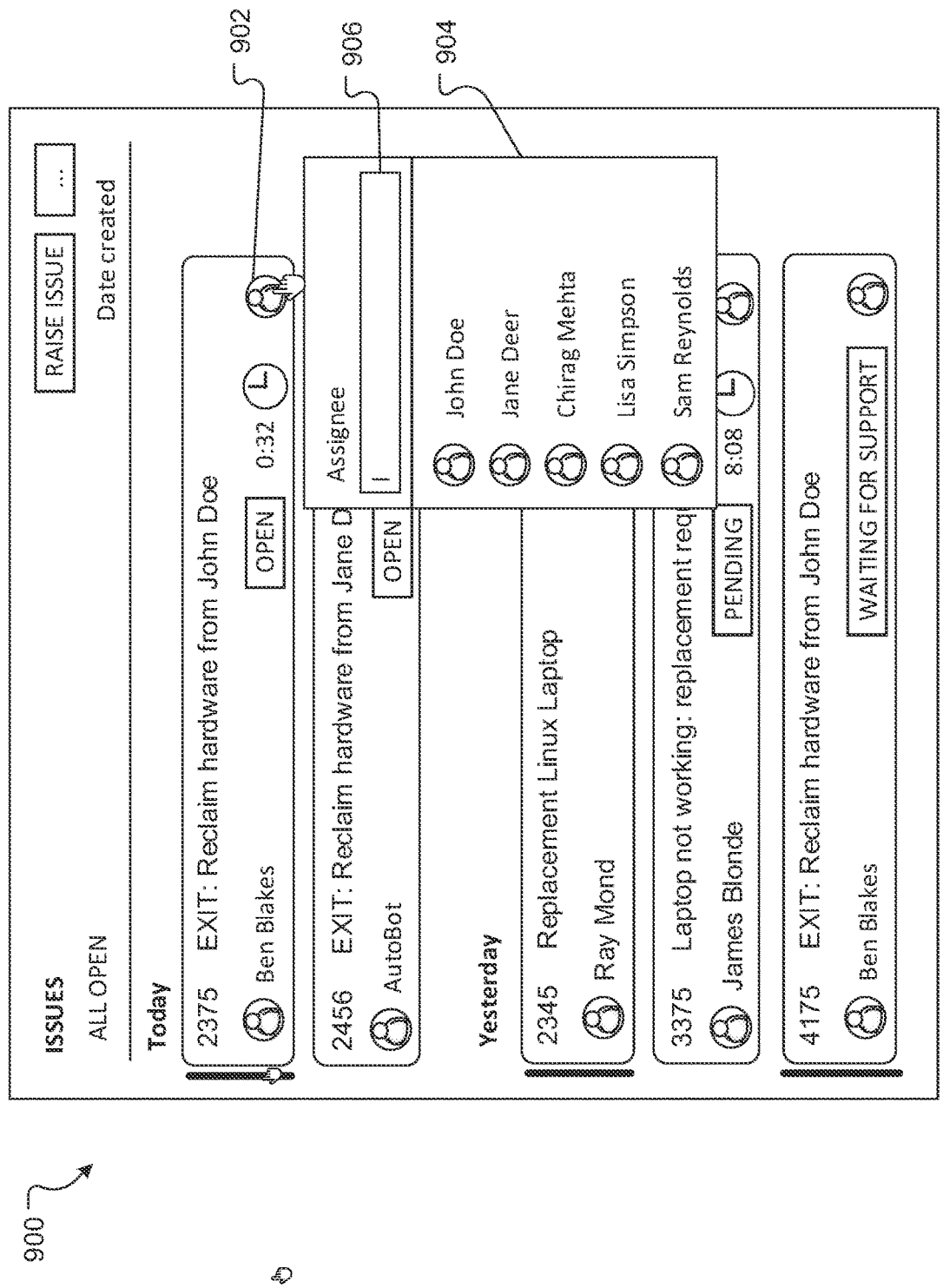
FIG. 9 is an example summary UI showing an action being performed.

FIG. 8 is a flowchart illustrating an example method for performing a transformative action via an issue card or activity update window. In case transformative actions are allowed, the corresponding issue cards or activity update window contents may be interactive. FIG. 9 illustrates an example summary UI that allows users to perform transformative actions directly from an issue card. In this example, the assignee affordance 902 is interactive. For example, a user may select the assignee affordance 902 in an issue card to be able to change the assignee directly from the issue card. In this example, a pop-up assignee selector control 904 is displayed to the user. The user may enter an assignee name in the text bar 906 or select an assignee from a drop down list.

Figure 10:
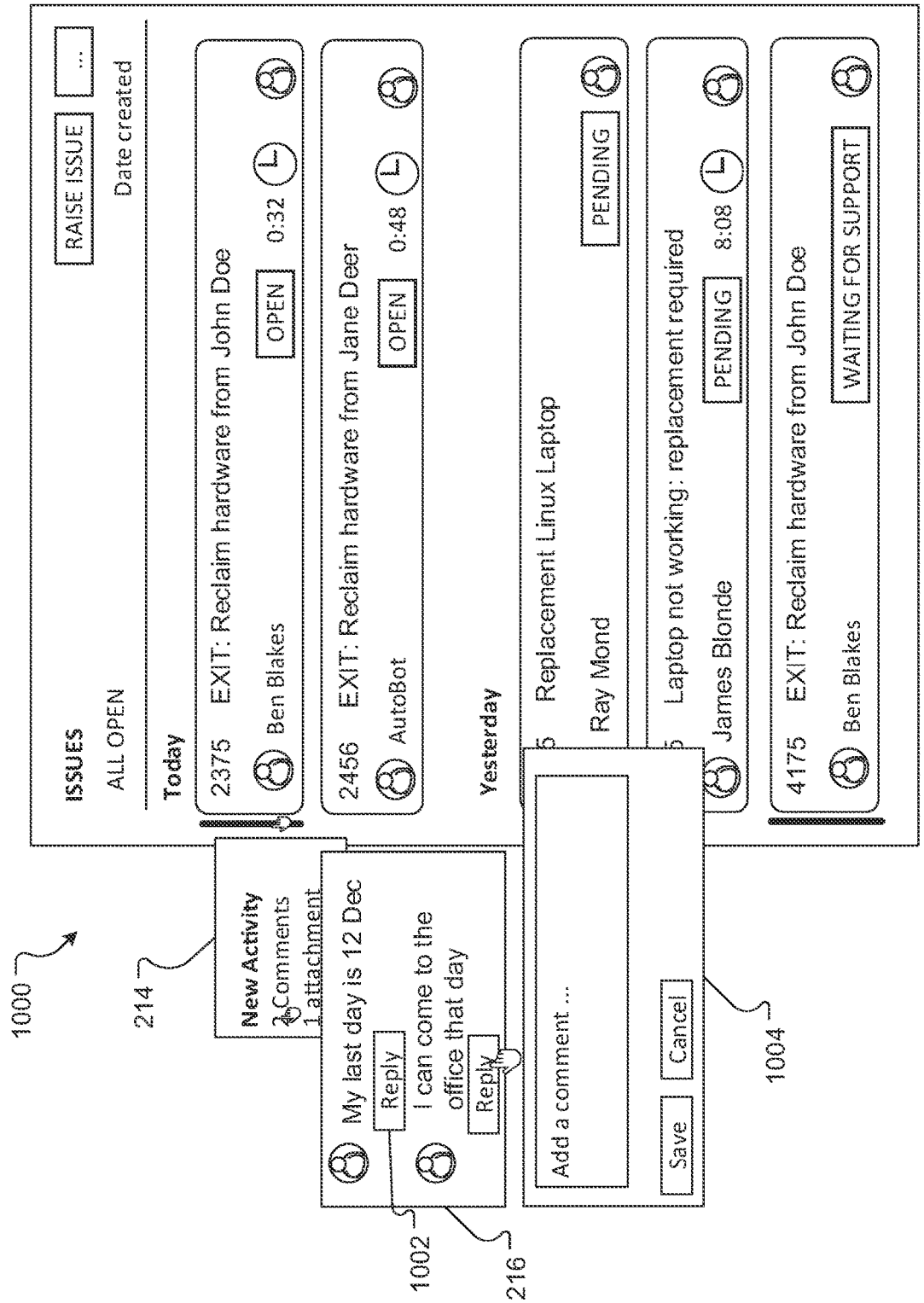
FIG. 10 is an example summary UI showing another action being performed.

Similarly, FIG. 10 illustrates another example summary UI that allows a user to perform a transformative action directly from an activity update window 214. In this example, the pop-up window 216 showing the two new customer comments includes an interactive reply button 1002. A user can select the reply button 1002, which cause a further comment pop-up window 1004 with an editor to be displayed. The user can add a comment using the editor and either save the comment or cancel the operation.

In addition, the user may be able to perform actions that do not necessarily update the underlying issue, but may alter the user's summary UI view. For example, the user may be able to pin one or more issues using control 208 so that the issues appear in the summary view despite any filters applied by the user. In another example, the user may be able to snooze an issue, e.g., using control 210, so that the issue is hidden from the summary view for a period of time or until a particular action occurs. Similarly, the user may be able to add a reminder for an issue.

To aid in description of this process, an example summary UI is considered that includes one or more interactive graphical elements representing transformative actions that may be performed on the corresponding issue directly from the summary view. It will be appreciated that the summary UI need not always include actionable items, let alone a transformative actionable items.

At operation 802, the client 312 detects selection of a particular actionable graphical element.

In response, the client 312 identifies the action corresponding to the selected graphical element and generates an action message at operation 804. The message includes the action that the user wishes to perform, a user identifier, an issue identifier of the issue for which the action is to be performed and in some examples, the identifier of the queue/project the user is currently viewing. For example, if the user wishes to update the assignee for a given issue, the action message includes data about the old assignee, the assignee selected by the user, the issue identifier of the issue for which the assignee is selected, and an identifier of the user that performed the action. Similarly, if the user adds a new comment in response to a particular comment, the action message includes the comment, the identifier of the comment that the user responded to, an identifier of the issue and an identifier of the user that wrote the comment. In another example, if the user wishes to pin a particular issue, the action message includes the identifier of the issue to be pinned, the identifier of the user, and the identifier of the queue/project the user is currently viewing.

This action message is forwarded to the ITS at operation 806. The ITS may provide a particular endpoint for servicing action requests from summary UIs. This endpoint, also referred to as an action URL, is available at the client 312. The client 312 retrieves the action URL from its local cache and forwards the action message to the endpoint corresponding to the action URL.

It will be appreciated that sometimes a user may have permission to view a particular issue (because the user has view permissions for the underlying content), but the user may not have sufficient permission to modify/write to the issue. Accordingly, at operation 808, the UI manager 327 determines whether the user is allowed to perform the action. Known access permission methods may be employed (including key or token based permissions) to make this determination and this operation is not described in detail here.

If the UI manager determines that the user has permission to perform the action, the method 800 proceeds to operation 810 where the UI manager 327 performs the action on the issue. For example, it may update the assignee of the issue, add the user comment to the issue data, add a new record in the pin data table B for the given issue. Once the action has been successfully performed, the UI manager 327 may forward a success message to the client 312 at operation 812.

The client 312 in turn updates the summary UI at operation 814 to reflect that the action has been successfully performed. For example, in case the user had changed the assignee, the corresponding issue card is updated to show the avatar/name of the newly assigned person. Alternatively, if the comment has been updated, editor and reply/cancel buttons may disappear and the user comment may be added to the comment pop-up window 1004. Similarly, if the issue has been pinned, the interactive control 208, may change into a non-interactive highlighted pin icon.

Additionally or alternatively, if at operation 808 it is determined that the user is not allowed to perform the action, an unsuccessful message is generated at operation 816 and passed back to the user device 310 at operation 818.

The client 312 may then update the user interface to indicate that the user is not permitted to perform the action (e.g., by removing the action buttons, interactive controls) or may indicate that the action was unsuccessful by showing an error message, or in some other manner.

In some cases, although the user may have permission to perform the action, the action may nonetheless not be successfully performed (e.g., because the action is no longer available at the source, the action has already been performed by another user, or the ITS timed out). In such cases, the server 332 may generate and forward a suitable error message to the user device 310 to inform the user that the action was not successfully performed. In some cases, the user may be given the option to try again and in other cases the action graphical elements may be removed. It will be appreciated that these are only two possible ways and that other techniques may also be contemplated to inform the user that the action was unsuccessful and these other techniques are within the scope of the present disclosure.

The flowcharts illustrated in the figures and described above define operations in particular orders to explain various features. In some cases the operations described and illustrated may be able to be performed in a different order to that shown/described, one or more operations may be combined into a single operation, a single operation may be divided into multiple separate operations, and/or the function(s) achieved by one or more of the described/illustrated operations may be achieved by one or more alternative operations. Still further, the functionality/processing of a given flowchart operation could potentially be performed by different systems or applications.

Unless otherwise stated, the terms "include" and "comprise" (and variations thereof such as "including," "includes," "comprising," "comprises," "comprised" and the like) are used inclusively and do not exclude further features, components, integers, operations, or elements.

Although the present disclosure uses terms "first," "second," and so on to describe various elements, these terms are used only to distinguish elements from one another and not in an ordinal sense.

It will be understood that the embodiments disclosed and defined in this specification extend to alternative combinations of two or more of the individual features mentioned in or evident from the text or drawings. All of these different combinations constitute alternative embodiments of the present disclosure.

The present specification describes various embodiments with reference to numerous specific details that may vary from implementation to implementation. No limitation, element, property, feature, advantage or attribute that is not expressly recited in a claim should be considered as a required or essential feature. Accordingly, the specification and drawings are to be regarded in an illustrative rather than a restrictive sense.

What is claimed is:

1. A computer-implemented method of providing a user interface of an issue tracking system, the method comprising:
receiving a user interface request to display the user interface of the issue tracking system (ITS) from a user device;
causing display of a set of issue cards to be displayed in the user interface on the user device, each issue card of the set of issue cards corresponding to a respective issue managed by the ITS, each issue card including a set of interactive controls;
for each issue card of the set of issue cards, obtaining issue object data for the respective issue managed by the ITS;
for one or more issue cards of the set of issue cards, obtaining respective activity data corresponding to one or more actions performed during a time since the user interface was previously viewed;
causing at least a portion of the issue object data to be displayed in each respective issue card of the set of issue cards;
causing display of one or more activity indicators for the one or more issue cards for which activity data was obtained; and
in response to a user selection of a particular interactive control of the set of interactive controls for a particular issue card of the set of issue cards, causing an action selected from the plurality of actions to be performed with respect to a particular issue associated with the particular issue card, the action performed with respect to the particular issue on the ITS, wherein the plurality of actions is chosen from a list including: a pin action, a snooze action, a reminder setting action and an issue assign action.

2. The computer-implemented method of claim 1, wherein:
the reminder setting action defines a time at which a reminder for the particular issue will be displayed in the user interface.

3. The computer-implemented method of claim 1, wherein:
the snooze action suppresses display of the particular issue card within the user interface for a predefined amount of time.

4. The computer-implemented method of claim 1, wherein:
the issue assign action causes display of an assignee selector control, the assignee selector control includes a list of user identifiers; and
in response to a user selection of a particular user identifier of the list of user identifiers, cause a user account associated with the particular user identifier to be assigned to the particular issue in the ITS.

5. The computer-implemented method of claim 1, wherein the one or more activity indicators includes a respective graphical element positioned along a side of a respective issue card.

6. The computer-implemented method of claim 1, wherein
the action to pin the issue card causes the particular issue card to remain displayed within the user interface.

7. The computer-implemented method of claim 6, wherein pinned object cards corresponding to the action to pin the object card are displayed in a top portion of the user interface.

8. A computer-implemented method of providing a user interface of an issue tracking system, the method comprising:
receiving a user interface request to display the user interface of the issue tracking system (ITS) from a user device;
causing display of a set of issue cards to be displayed in the user interface on the user device, each issue card of the set of issue cards corresponding to a respective issue managed by the ITS, each issue card including a set of interactive controls;
for each issue card of the set of issue cards, obtaining issue object data for the respective issue managed by the ITS;
arranging the set of issue cards based at least in part on a timestamp of each issue card of the set of issue cards;
causing at least a portion of the issue object data to be displayed in each respective issue card of the set of issue cards, the issue object data including the timestamp; and
in response to a user selection of a particular interactive control of the set of interactive controls for a particular issue card of the set of issue cards:
causing an action selected from a plurality of actions to be performed with respect to a particular issue associated with the particular issue card, the action performed with respect to the particular issue on the ITS, wherein the plurality of actions is chosen from a list including: a pin action, a snooze action, a reminder setting action and an issue assign action; and
updating display of the user interface in accordance with the action performed.

9. The computer-implemented method of claim 8, wherein in response to a user interaction over a region of the particular issue, causing display of additional issue data.

10. The computer-implemented method of claim 9, wherein additional issue data includes an activity update corresponding to the particular issue.

11. The computer-implemented method of claim 8, wherein the timestamp corresponds to a date of issue creation.

12. The computer-implemented method of claim 8, wherein:
the issue assign action causes display of an assignee selector control, the assignee selector control includes a list of user identifiers;
in response to a user selection of a particular user identifier of the list of user identifiers, cause a user account associated with the particular user identifier to be assigned to the particular issue in the ITS; and
the updated display of the user interface includes an assigned user that corresponds to the user selection of the particular user identifier.

13. The computer-implemented method of claim 8, wherein:
the snooze action suppresses display of the particular issue card within the user interface for a predefined amount of time.

14. The computer-implemented method of claim 8, wherein the updated display includes a change in color of the particular issue card.

15. A computer-implemented method of providing a user interface of an issue tracking system, the method comprising:
- receiving a user interface request to display the user interface of the issue tracking system (ITS) from a user device;
- causing display of a set of issue cards to be displayed in the user interface on the user device, each issue card of the set of issue cards corresponding to a respective issue managed by the ITS, each issue card including a set of interactive controls;
- for each issue card of the set of issue cards, obtaining issue object data for the respective issue managed by the ITS;
- causing at least a portion of the issue object data to be displayed in each respective issue card of the set of issue cards;
- in response to a user selection of a particular interactive control of the set of interactive controls for a particular issue card of the set of issue cards:
  - obtaining user permissions data for the user; and
  - in accordance with the user satisfying a permissions criteria, causing an action selected from a plurality of actions to be performed with respect to a particular issue associated with the particular issue card, the action performed with respect to the particular issue on the ITS, wherein the plurality of actions is chosen from a list including: a pin action, a snooze action, a reminder setting action and an issue assign action.

16. The method of claim 15, wherein the user permissions data includes modify or write permission of an underlying content corresponding to the particular issue card.

17. The method of claim 15, comprising:
- subsequent to causing the action to be performed with respect to the particular issue, causing an updated display of the particular issue card in accordance with the action performed.

18. The method of claim 17, comprising:
- in response to the action to be performed with respect to the particular issue failing to be performed, causing an updated display of the particular issue card indicating that the action failed.

19. The method of claim 15, wherein:
- the action to be performed includes adding a comment to the particular issue card; and
- in accordance with the user satisfying a permissions criteria, cause display of a pop-up window having a comment area.

20. The method of claim 19, comprising:
- subsequent to a user satisfying the permissions criteria and inputting the comment in the pop-up window, updating display of the particular issue card, the updated display comprising the comment.

* * * * *